United States Patent
Barsness et al.

(10) Patent No.: US 8,132,031 B2
(45) Date of Patent: Mar. 6, 2012

(54) POWER ADJUSTMENT BASED ON COMPLETION TIMES IN A PARALLEL COMPUTING SYSTEM

(75) Inventors: Eric Lawrence Barsness, Pine Island, MN (US); David L. Darrington, Rochester, MN (US); Amanda Peters, Cambridge, MA (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/405,353

(22) Filed: Mar. 17, 2009

(65) Prior Publication Data

US 2010/0241884 A1  Sep. 23, 2010

(51) Int. Cl.
*G06F 1/00* (2006.01)
*G06F 1/26* (2006.01)
*G06F 15/173* (2006.01)
*G06F 15/00* (2006.01)

(52) U.S. Cl. ............ 713/320; 713/300; 709/226; 712/9; 712/12; 712/28; 712/32

(58) Field of Classification Search .................. 713/300, 713/320; 709/226; 712/9, 12, 28, 32
See application file for complete search history.

(56) References Cited

U.S. PATENT DOCUMENTS

| 7,698,575 B2 * | 4/2010 | Samson | 713/300 |
| 7,958,508 B2 * | 6/2011 | Shimizu et al. | 718/102 |
| 2002/0095610 A1 * | 7/2002 | Nunomura | 713/322 |
| 2010/0058086 A1 * | 3/2010 | Lee | 713/322 |

\* cited by examiner

*Primary Examiner* — Stefan Stoynov
(74) *Attorney, Agent, or Firm* — Wood, Herron & Evans LLP

(57) ABSTRACT

A method, apparatus, and program product optimize power consumption in a parallel computing system that includes a plurality of computing nodes by selectively throttling performance of selected nodes to effectively slow down the completion of quicker executing parts of a workload of the computing system when those parts are dependent upon or otherwise associated with the completion of other, slower executing parts of the same workload. Parts of the workload are executed on the computing nodes, including concurrently executing a first part on a first computing node and a second part on a second computing node. The first node is selectively throttled during execution of the first part to decrease power consumption of the first node and conform a completion time of for the first node in completing the first part of the workload with a completion time for the second node in completing the second part.

21 Claims, 6 Drawing Sheets

POWER ADJUSTMENT BASED ON COMPLETION TIMES IN A PARALLEL COMPUTING SYSTEM

FIELD OF THE INVENTION

The present invention relates to computing systems, and more particularly throttling performance of computing nodes of a computing system of the type that includes a plurality of computing nodes.

BACKGROUND

Computing system technology has advanced at a remarkable pace recently, with each subsequent generation of computing system increasing in performance, functionality, and storage capacity, often at reduced cost. However, individual computing systems are still generally expensive and incapable of providing the raw computing power that is often required by modern requirements for computing power. One particular type of computing system architecture that generally fills this requirement is that of a parallel processing computing system. Each parallel processing computing system is often referred to as a "supercomputer."

Generally, a parallel processing computing system comprises a plurality of computing nodes and is configured with a distributed application. Some parallel processing computing systems, which may also be referred to as massively parallel processing computing systems, may have hundreds or thousands of individual computing nodes, and provide supercomputer class performance. Each computing node is typically of modest computing power and generally includes one or more processing units, or computing cores. As such, each computing node may be a computing system configured with an operating system and distributed application. The distributed application provides work for each computing node and is operable to control the workload of the parallel processing computing system. Generally speaking, the distributed application provides the parallel processing computing system with a workload that can be divided into a plurality of tasks. Typically, each computing node, or each computing core, is configured to process one task and therefore process, or perform, a specific function. Thus, the parallel processing architecture enables the parallel processing computing system to receive a workload, then configure the computing nodes to cooperatively perform one or more tasks such that the workload supplied by the distributed application is processed.

Parallel processing computing systems have found application in numerous different computing scenarios, particularly those requiring high performance and fault tolerance. For instance, airlines rely on parallel processing to process customer information, forecast demand, and decide what fares to charge. The medical community uses parallel processing computing systems to analyze magnetic resonance images and to study models of bone implant systems. As such, parallel processing computing systems typically perform most efficiently on work that contains several computations that can be performed at once, as opposed to work that must be performed serially. The overall performance of the parallel processing computing system is increased because multiple computing cores can handle a larger number of tasks in parallel than could a single computing system. Other advantages of some parallel processing systems include their scalable nature, their modular nature, and their improved level of redundancy.

When processing a workload, computing nodes of a parallel processing computing system typically operate at their highest possible performance to process each task of the workload as fast as possible. These computing nodes typically consume a large amount of power as well as generate a large amount of heat. As such, large and complex air handling systems must be designed and installed to keep the room, or rooms, where a parallel processing computing system is installed at a set temperature. Conventional methods of reducing the consumed power and/or the generated heat have generally included limiting the power to the computing nodes such that they are forced to run at lower speeds or taking various nodes of the parallel processing computing system offline at various times to reduce the heat generated by the parallel processing computing system as a whole. However, both methods prevent parallel processing computing systems from operating at peak efficiency. Additionally, both methods typically increase the time required to process a workload, which is often an unacceptable solution in a modern business environment.

Consequently, there is a need to schedule parts of a workload of a parallel processing computing system in such a manner that reduces the amount of power consumed by computing nodes without reducing the overall processing capabilities of the parallel processing computing system.

SUMMARY OF THE INVENTION

Embodiments of the invention provide for a method, apparatus, and program product to address power consumption and heat generation issues that arise when scheduling parts of a workload across a parallel computing system. In particular, embodiments of the invention provide for selectively throttling performance of one or more computing nodes processing shorter running parts of a workload in order to decrease power consumption of the parallel computing system. Given the completion time of a multi-part workload is typically controlled by the longest running parts of the workload, for workloads where it is anticipated that the completion times of one or more parts of the workloads will be earlier than for other parts of the workloads, the performance of the computing nodes assigned to handle such earlier-completing parts of the workload may be selectively throttled to reduce the power consumption associated with processing those parts of the workload, and often with little or no effect on the completion time for the overall workload. Embodiments of the invention take advantage of the fact that certain computing nodes that process shorter running parts of a workload may, without throttling, complete their respective parts well prior to the completion of other parts of the workload. Thus, by throttling performance of such computing nodes, power consumption is lowered, while the completion times of the shorter running parts are delayed to conform more closely with the completion times of other parts of the workload.

In one embodiment consistent with aspects of the invention, the consumption of power is reduced by executing a plurality of parts of the workload on a plurality of computing nodes in the parallel computing system, including concurrently executing a first part of the workload on a first computing node and a second part of the workload on a second computing node. The performance of the first computing node is selectively throttled during the execution of the first part of the workload to conform a completion time for the first computing node in completing the first part of the workload with a completion time for the second computing node in completing the second part of the workload, thus decreasing power consumption of the first computing node.

In that embodiment, a first node completion time and a second node completion time may be generated. Each node completion time respectively indicates an estimated completion time for the first or second computing node to complete the first or second part of the workload at full performance. The first and second node completion times are compared, and in response to this comparison, the first computing node is selectively throttled to decrease execution of the first part of the workload to consume a portion of time that would otherwise exist between the first and second node completion times.

In some embodiments, the throttled performance of the first computing node may be overridden during execution of the first part of the workload to increase power consumption of the first computing node when there is work to be processed on the first computing node after completion of the first part of the workload. In other embodiments, the throttled performance of the first computing node may be overridden during execution of the first part of the workload to increase power consumption of the first computing node in response to determining that the first part of the workload will not be completed by the completion time for the second computing node in completing the second part of the workload.

These and other advantages will be apparent in light of the following figures, detailed description, and illustrative examples.

BRIEF DESCRIPTION OF THE SEVERAL VIEWS OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF THE INVENTION

Figure 1:
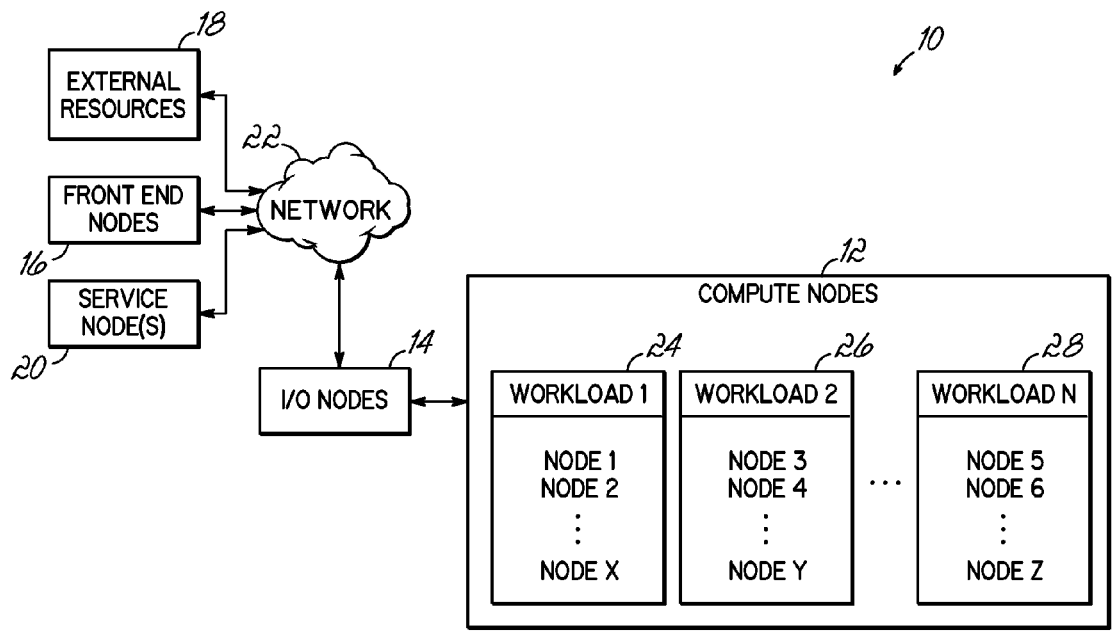
FIG. 1 is a diagrammatic illustration of parallel processing computing system consistent with embodiments of the invention.

Embodiments of the present invention include a method, apparatus, and program product to address power consumption issues that arise when processing a workload across computing nodes of a parallel processing computing system.

Parallel processing computing systems, such as the BlueGene/L system created by International Business Machines, often include a cellular node architecture. As discussed below in detail, the BlueGene/L system is built from blocks of node midplanes that may be connected through several inter- and intra-midplane networks. The system may be constructed incrementally, with midplane cells being added to build the larger, final system.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. "Torus" implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane. Each node is configured with one or more computing cores.

The parallel processing computing system is configured to receive a workload and divide the workload into parts, or tasks, that are operable to be executed, or processed, by the nodes of the system. As such, the parallel processing computing system is configured to perform several computations at once. Each node may execute one task, or each computing core may execute one task, depending on the configuration of the parallel processing computing system. In one embodiment consistent with the invention to decrease power consumption of the parallel processing computing system, there is provided a method that throttles the performance of nodes during execution of parts of the workload. In one embodiment of the invention, a plurality of parts of the workload are respectively executed on a plurality of computing nodes in the parallel processing computing system. As such, a first part of the workload is executed on a first computing node from among the plurality of computing nodes concurrently with a second part of the workload executed on a second computing node from among the plurality of computing nodes.

The performance of the first computing node while executing the first part of the workload is selectively throttled to conform a completion time for the first computing node in completing the first part of the workload with a completion time for the second computing node in completing the second part of the workload. In particular, embodiments of the invention "conform" completion times of the first and second computing node by reducing performance of the first node such that the first computing node completes execution of the first part (or multiple parts assigned to the first computing node) closer to the completion time of the second computing node executing the second part than it would otherwise if the first computing node were run at full performance. As such, conforming the completion time may include consuming a portion of time that would otherwise be wasted between completing the first part at full performance and then completing the second part at full performance. When completion times are conformed, the completion time of the throttled computing node may be equal to that of the non-throttled computing node, or may still be earlier, albeit closer in time. In addition, in some embodiments the completion time of the throttled computing node may ultimately be later in time than that of the non-throttled computing node, but closer in absolute terms than if the throttled computing node operated at full performance.

Additionally, embodiments of the invention may selectively override performance throttling in response to another part of the workload, or a part of another workload, being scheduled on the first node, while attempting to conform the completion time of the first and third parts to the completion time of the second part. Embodiments of the invention may also selectively override performance throttling in response to determining that a first part of the workload that was previously throttled will not complete by the completion time of the second part. Selectively throttling a node may include running that node as slow as possible such that the node operates only when it needs to. Advantageously, conforming the completion times of computing nodes reduces power consumption, often with little or no effect on the overall completion time of the workload or overall system performance.

Hardware and Software Environment

Turning to the drawings, wherein like numbers denote like parts throughout several views, FIG. 1 is a diagrammatic illustration showing a parallel processing computing system (system) 10 consistent with one embodiment of the invention. In particular, the system 10 may have an architecture consistent with a BlueGene® computer architecture, as developed by International Business Machines, Inc. (IBM) of Armonk, N.Y. For example, and in other embodiments, the architecture of the system 10 may be consistent with a BlueGene/L architecture, a BlueGene/C architecture, a BlueGene/P architecture, a BlueGene/Q architecture, another parallel processing system architecture, or combinations thereof. Therefore, it will be appreciated by one having ordinary skill in the art that the system 10 is representative of other parallel processing systems.

The system 10 may include a plurality of processing nodes (hereinafter, "nodes"). The nodes may include a plurality of computing nodes ("compute nodes") 12 and a plurality of input/output nodes ("I/O nodes") 14. The compute nodes 12 may be arranged in a regular array or matrix and collectively perform the bulk of the work performed by the system 10. Each compute node 12 includes one or more computing cores and a memory from which to store and execute tasks. The compute nodes 12 communicate with each other through a torus network or a tree network, as described more fully herein. A fully configured BlueGene/L system, in one specific embodiment, includes about 65,536 compute nodes 12 operable to process tasks and about 1,024 I/O nodes 14 operable to maintain an interface between the compute nodes 12 and other system components.

The I/O nodes 14 maintain an interface between the compute nodes 12 and front end nodes 16, external resource servers 18, service nodes 20, and network 22. The I/O nodes 14 may interface with the front end nodes 16, external resource servers 18, and service nodes 20 by way of the network 22, which in a specific embodiment may be a gigabit Ethernet network. The I/O nodes 14 are operable to maintain communication for a group of compute nodes 12 from among the plurality of compute nodes 12. In a specific embodiment, each I/O node 14 maintains communications for up to sixty-four compute nodes 12. In this manner, each I/O node 14 provides access to resources of the system 10 and processes, programs, tasks, or data in other systems for a specific number of compute nodes 12. The I/O nodes 14 may also be operable to perform process authentication and authorization, job accounting, debugging, troubleshooting, booting, and configurations. Thus, tasks for the compute nodes 12 are simplified and additional burdens on each compute node 12 that would present themselves by interfacing with vast numbers of I/O nodes 14 and other system components are avoided.

The front end nodes 16 may store compilers, linkers, loaders, and other programs to interact with the system 10. The front end nodes 16 may be accessed by a user, who may submit one or more programs for compiling, tasks for execution, execution contexts, workloads, part of a workload, or jobs to the service nodes 20. As such, the front end nodes 16 may be configured with user interfaces, such as user input devices and a display (neither shown). In alternate embodiments, the front end nodes 16 may interface with one or more workstations or other computing systems (not shown). The front end nodes 16 may each include a collection of processor and memory that performs certain auxiliary functions which, for reasons of efficiency or otherwise, are best performed outside compute nodes 12, I/O nodes 14, or service nodes 20. For example, interactive data input, software code editing, software code compiling, and/or other user interface functions may be handled by front end nodes 16.

The service nodes 20 may include databases and administrative tools for the system 10. The databases may maintain state information for the computing nodes 12, including the current performance throttling of each computing node 12, while the administrative tools may control the scheduling and loading of programs, tasks, data, and jobs onto the compute nodes 12, and in particular onto each computing core. As such, the service nodes 20 may, in some embodiments, gather a subset of compute nodes 12 from the plurality of compute nodes 12 (i.e., a "block" of two or more compute nodes 12) and dispatch at least one task, job, application, execution context, or program to the block of compute nodes 12 for execution. Hereinafter, the at least one task, job, application, part of a workload, execution context, or program will be referred to as a "task" for the sake of brevity. A task may be communicated across the network 22 and through the I/O nodes 14 to a compute node 12 to be processed by a computing core of the compute node 12. It will be appreciated by one having ordinary skill in the art that the functionality of the front end nodes 16 and service nodes 20 may be combined to form a control subsystem operable to manage, control, and schedule tasks for the compute nodes 12.

Front end nodes 16 and service nodes 20 may each include of a block of compute nodes 12 and at least one I/O node 14 of the system 10. In this way, front end nodes 16 and service nodes 20 may be internally connected to the compute nodes 12 and I/O nodes 16 through one or more of the plurality of networks described hereinafter. Alternately, front end nodes 16 and service nodes 20 may each include of a block of compute nodes 12 and at least one I/O node 14 separate from the system 10 (i.e., "stand-alone" nodes). The external resource servers 18 may be servers that provide interfaces to various data storage devices, such as, for example, disk drives 19, or other I/O devices, resources, or components that may be accessed to complete a task.

In a typical embodiment, the compute nodes 12 are configured with a plurality of workloads 24, 26, and 28. Each workload 24, 26, or 28 is generally split into individual tasks, each task being performed by one or more compute nodes 12. As shown in FIG. 1, the first workload 24 is processed by "x" nodes, while the second workload 26 and third workload 28 are processed by "y" nodes and "z" nodes, respectively.

Figure 2:
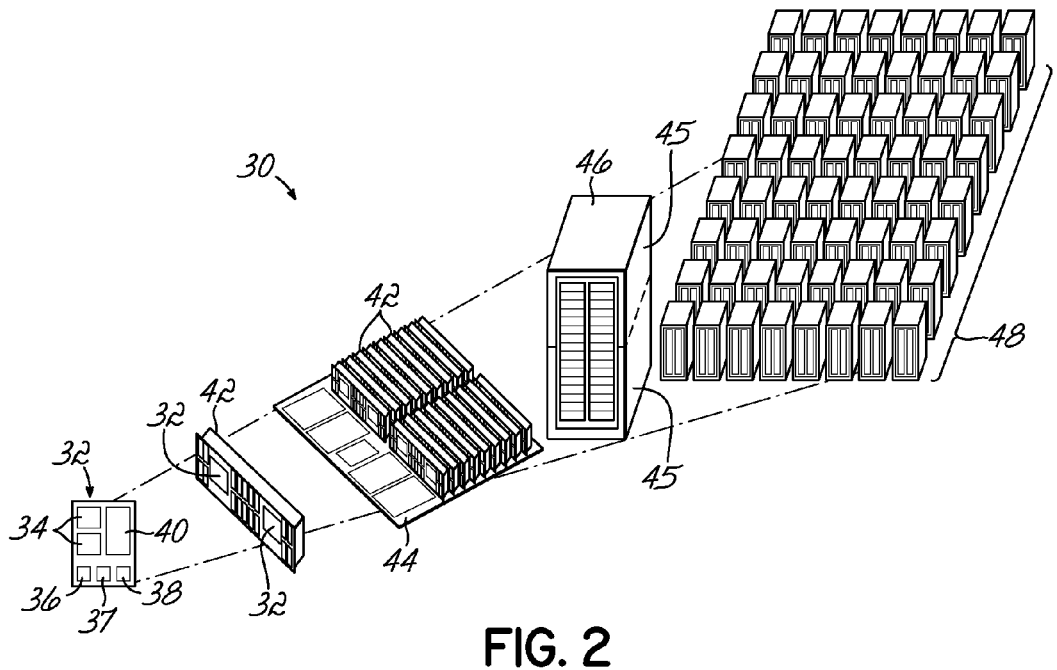
FIG. 2 is a diagrammatic illustration of an architecture of the parallel processing computing system of FIG. 1 showing the element progression from a computing core to a card, a node board, a cell, a cabinet, and finally to the parallel processing computing system consistent with embodiments of the invention.

FIG. 2 is a diagrammatic illustration 30 showing components 32, 42, 44, 46, and 48 of the system 10 consistent with embodiments of the invention. The system 10 comprises a highly scalable, cell-like architecture that can be replicated in a regular pattern as the system is scaled up.

The system 10 fundamentally includes the plurality of nodes, a node being shown generally at 32 (i.e., node 32 may be a compute node 12, an I/O node 14, a front end node 16, or a service node 20). Each node 32 typically comprises one or more computing cores 34, an Ethernet adapter 36, a torus network adapter 37, a collective network adapter 38, and a memory 40, which may be a local and/or remote cache memory. About two nodes 32 may be mounted onto a card 42. About seventeen cards 42 (i.e., in one specific embodiment, sixteen compute node 12 cards and one I/O node 14 card) are typically placed on a node board 44. About sixteen node boards 44 comprise a midplane, or cell 45, two of which may be positioned inside a cabinet 46 for a total of up to about one-thousand and twenty-four compute nodes 12 and up to about sixty-four I/O nodes 14 per cabinet 46, or about five-hundred and twelve compute nodes 12 and about thirty-two I/O nodes 14 per cell 25. The system 10 may include up to about sixty-four cabinets 46 as shown at 48, and, thus, in some embodiments, over sixty-nine thousand nodes. In alternate implementations of the system 10 consistent with embodiments of the invention, there may be more or fewer cabinets 46, cells 45, boards 44, cards 42, and/or nodes 34.

Figure 3:
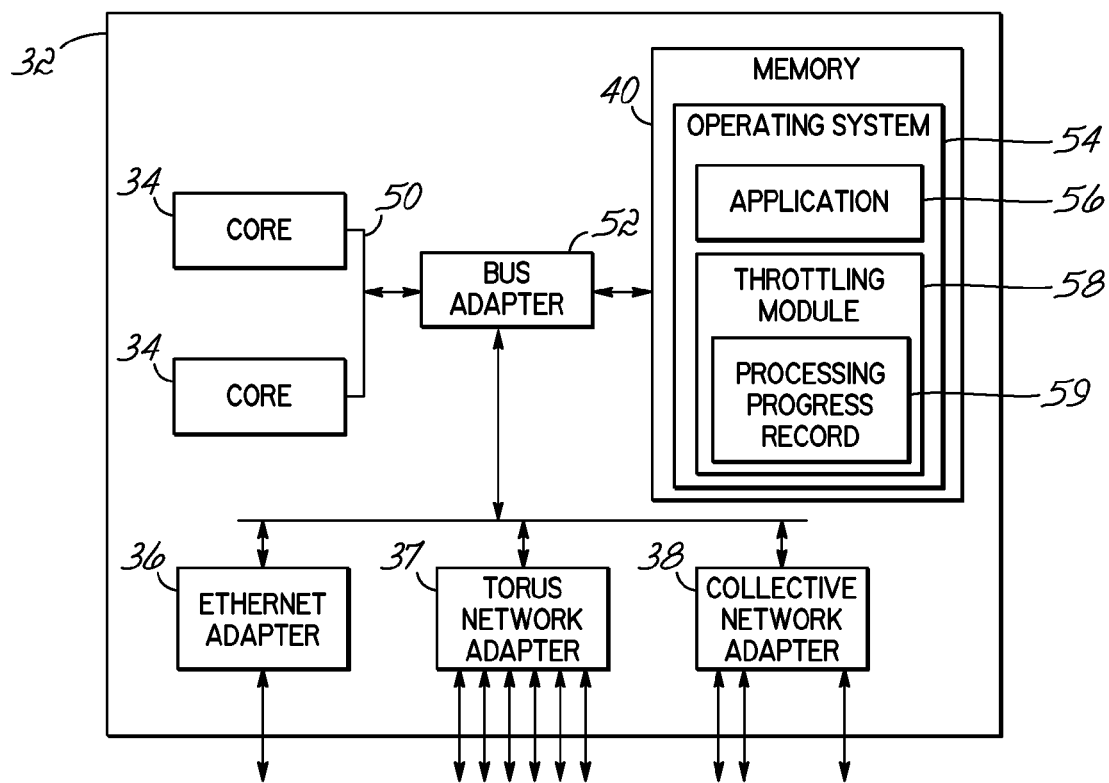
FIG. 3 is a block diagram showing the hardware and software components of one embodiment of the computing core of FIG. 2.

FIG. 3 is a block diagram showing the hardware and software components of one embodiment of the node 32 of the system 10 of FIG. 1 and FIG. 2. Each node 32 includes one or more computing cores 34 that communicate with a memory 40 by way of a bus as at 50 managed by a bus adapter 52. Each computing core 34 may include one or more processors, controllers, field programmable gate arrays, or application specific integrated circuit, while memory 40 may include random access memory devices (including synchronous dynamic random access memory), cache memories, non-volatile memories, and read-only memories. For example, and in one specific embodiment, each computing core 34 may be a microprocessor, such as a PowerPC microprocessor as produced by IBM. For example, and in another specific embodiment, each computing core 34 may be a multi-element architecture microprocessor that includes one general purpose processing element and a plurality of synergistic processing elements, such as a Cell Broadband Engine Architecture microprocessor as jointly developed by IBM, Sony Computer Entertainment of Tokyo, Japan, and Toshiba of Tokyo, Japan. As shown in FIG. 3, each node 32 includes two computing cores 34. One having ordinary skill in the art will appreciate that each node 32 may include more or fewer computing cores 34 than those illustrated, and in one specific embodiment each node 32 includes four computing cores 34.

Each node 32 is configured with an operating system 54 operable to execute an application 56. The operating system 54 may be a simplified-function operating system that includes state data for maintaining the processing state(s) of the node 32. In one specific embodiment, operating system 54 is operable to only support only one, or a few, tasks at a given time, as opposed to a multi-tasking operating system configured on a typical personal computing system. As such, operating system 54 may not, and advantageously does not, include certain functions normally associated with a multi-tasking operating system, including software, routines, components, or program code to support multi-tasking, various I/O devices, error diagnostics and recovery, etc. In one specific embodiment, the operating system 54 may include a simplified version of a Unix-like operating system, such as Linux. It will be appreciated by one having ordinary skill in the art that other operating systems may be used, and that it is not necessary that all nodes 32 employ the same operating system (i.e., the application 56 may be a "multi-platform" application operable to be installed across multiple and different operating systems or operating environments).

Application 56 is a copy of program code being executed by the node 32, and may include a complete copy of program code being executed by the system 10. Alternately, application 56 may be a subdivided portion of the program code being executed by the system 10 as a whole. As such, the application 56 may be a distributed application of the type that is operable to be configured across a plurality of nodes 32 (i.e., more than one node 32) to process a workload 25, 26, or 28. Application 56, in one embodiment, is operable to configure one or more tasks for each computing core 34 on the node 32 upon which it is configured. Local copies of data for the application 56, or data from the application 56, may be reserved in some portion of memory 40 in a file cache (not shown). Memory 40 may also include an application stack (not shown) that includes data corresponding to the execution progress of a task by the application 56.

Memory 40 may include a throttling module 58 configured to throttle the operations, clock speed, or overall processing speed of each computing node 32 and/or each computing core 34 of each computing node 32. As such, each throttling module 58 is configured to decrease the power consumption of a node 32 by throttling that node's 32 performance as slow as possible while retaining the ability for that node 32 to conform its processing of its task by a required or desired completion time. The completion time, in a specific embodiment, is a specific range of time. For example, the completion time may be five minutes and three seconds, thus indicating that work should be completed in five minutes and three seconds. One having ordinary skill in the will appreciate that the completion time may be alternately defined without departing from the scope of the invention, and in one specific embodiment may be a specific time in the future. For example, and not intending to be limiting, an alternately defined completion time may be at 17:26:57. Thus, the node 32 attempts to conform its processing of its task by that alternately defined completion time.

In response to receiving a workload, a throttling module 58 may determine an estimated completion time for a workload (workload completion time) based on a number of factors, including historical data about a completion time of a previous workload processed by the system 10. Additionally, the throttling module 58 may determine the workload completion time based on historical data about a previous workload completion time of parts of a workload across one or more nodes 32 and/or computing cores 34, and this determination may further include a determination of the number of nodes 32 and/or computing cores 34 that were previously assigned to the workload and how many are currently assigned to the workload. Other factors that the throttling module 58 may use to determine the workload completion time may include the total data required to be processed to complete the workload, the total data required to be processed to complete a task or all the tasks of the workload, the time required to access a resource or resources by a node 32 to complete the workload and/or a task of the workload, and which of the nodes 32 and/or computing cores 34 are currently configured with tasks (those that are "busy") and which are currently not configured with tasks (those that are "free"). In a specific embodiment, the workload completion time may correspond to the longest completion time that a node 32 of the system 10 may incur to complete a task of the workload.

In addition to determining the workload completion time, the throttling module 58 may be configured on each of the nodes 32 and determine a completion time for a task, or part, of a workload to be processed by that node 32 upon which it is configured. Thus, the throttling module 58 determines an estimated completion time for individual nodes 32 to complete a task (node completion time). The throttling module 58 may determine the node completion time based on a number of factors, including historical data about a previous node completion time of a previous task processed by that, or another, node 32. Additionally, the throttling module 58 may determine the node completion time based on historical data that indicates the total data required to be processed to complete the task, the time required to access a resource or resources by that node 32 to complete the task, and whether that node 32 and/or computing core 34 is currently free. The determined workload completion time, and the determined node completion time, may be stored in a processing progress record 59 configured in the throttling module 58.

Through a comparison of the workload completion time and the node completion time, and a subsequent determination of the throttling of the node 32 to conform the two times, individual nodes 32 of the system 10 may have their performance throttled to balance work processed by the system 10, power consumption of the system 10, and/or heat generated by the system 10. For example, a node 32 may receive a task and a workload completion time. The throttling module 58 for that node 32 may determine a node completion time, determine the workload completion time, and determine a throttling of the computing nodes 32 sufficient to conform the node and workload completion times. All this data may be stored in the processing progress record 59. As such, information from the processing progress record 59, or the processing progress record 59 itself, may be communicated to nodes 32, such as between one or more of the compute nodes 12, I/O nodes 14, front end nodes 16, and service nodes 20, to manage the throttling of the system 10.

The computing cores 34 may communicate through the bus 50 to the bus adapter 52. The bus adapter 52 maintains the integrity of data flow in the node 32 and manages the data communication of the computing cores 34, network adapters 36, 37, and 38, as well as memory 40. The network adapters may include an Ethernet adapter 36, a torus network adapter 37, and a collective network adapter 38. The Ethernet adapter 36, torus network adapter 37, and collective network adapter 38 interconnect each node 32 to provide multiple complimentary, high speed and low latency networks. These networks may include a private Ethernet network that provides access to any node 32 for configuration, booting, and/or diagnostics (i.e., through the Ethernet adapter 36), as well as a three-dimensional torus network operable to provide peer-to-peer communication between the nodes 32 (i.e., through the torus network adapter 37) and a collective network for collective messaging communication (i.e., through the collective network adapter 38). Each node 32 may use part of one computing core 34, or one or more computing cores 34 in their entirety, to manage the network connections and the network adapters 36, 37, and 38 of that node 32.

One having ordinary skill in the art will appreciate that additional components, memory, communications adapters, network adapters, or interfaces may be provided for each node 32 without departing from the scope of the present invention. For example, and in a specific embodiment, each I/O node 14 may be further configured with additional adapters, such as another Ethernet adapter or other I/O hardware to communicate with the front end nodes 16, external resource servers 18, service nodes 20, and/or network 22. Additionally, in another specific embodiment, each I/O node 14 may be configured with an operating system 54 that includes additional I/O interface software or software that adds additional functionality, such as software that dedicates one or more computing cores 34 to I/O operations only. Furthermore, each I/O node 14 may be configured with additional components, such as a computing core 34 dedicated only to I/O operations and an additional external memory that provides the I/O node 14 additional resources to perform I/O tasks. In another specific embodiment, each node 32 may be further configured with an adapter to communicate to a JTAG master circuit, providing back-door access into the node 32 for testing and troubleshooting in a manner well known in the art.

Figure 4:
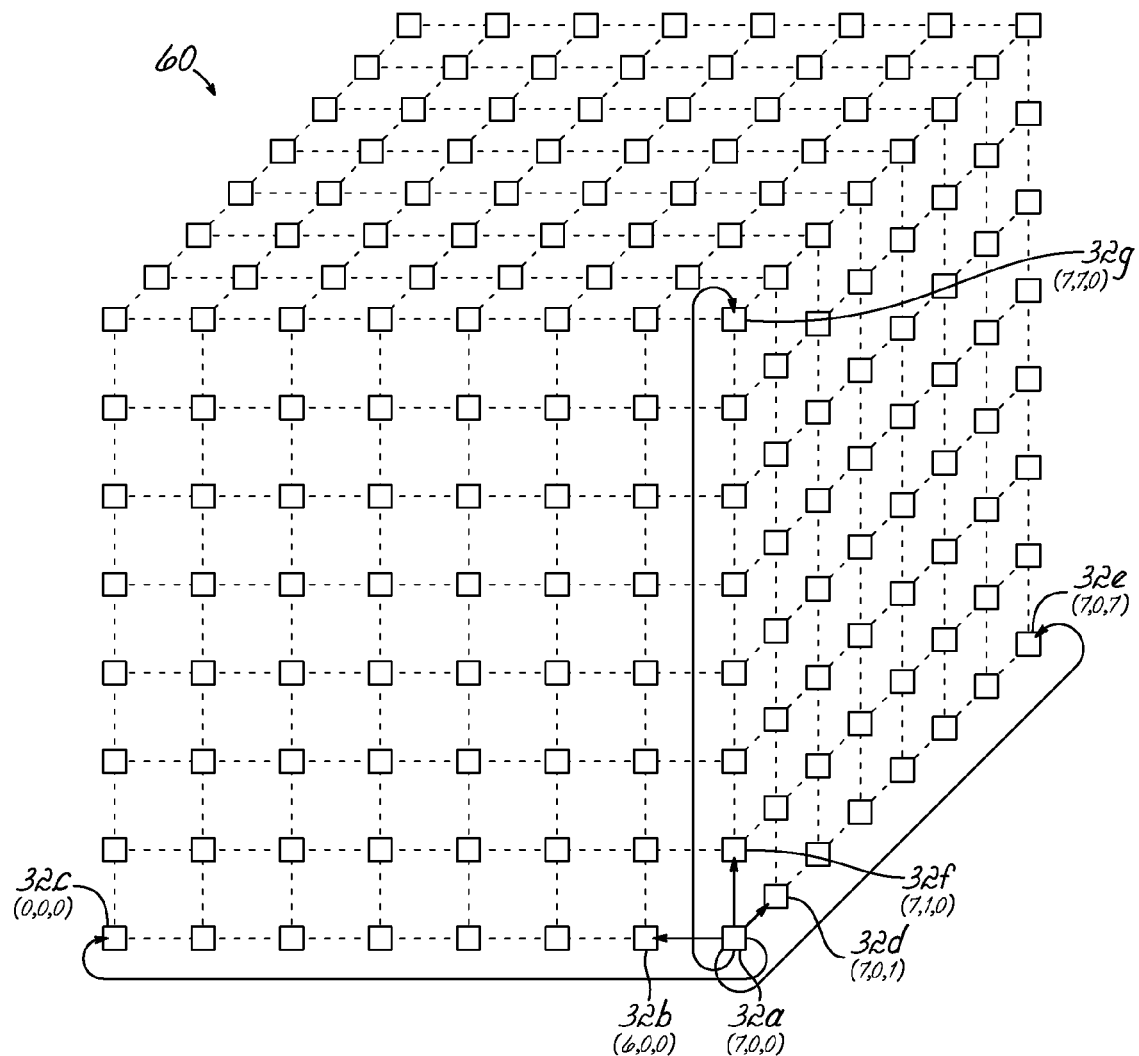
FIG. 4 is a simplified block diagram illustrating a three-dimensional torus network through which the computing cores of the parallel processing computing system of FIG. 1 and FIG. 2 may communicate.

The torus network adapter 37 provides each node 32 access to a point-to-point network configured as a three-dimensional torus where every node is connected to six other nodes in a mesh, forming a "cube" of (x,y,z) nodes. As such, each node 32 may communicate in one of six directions through the six bidirectional links shown coming from the torus network adapter 37 in FIG. 3. FIG. 4 is a simplified block diagram showing the three-dimensional torus network 60 of a cell 45 of the system 10 of FIG. 1 and FIG. 2. As illustrated in FIG. 4 and previously disclosed, each cell 45 may include an eight-by-eight matrix of five-hundred and twelve interconnected nodes 32. Advantageously, each node 32 may be equally distant to its six neighbors, except for those on the "edges" or "faces" of the torus network 60 (i.e., the edges or faces of the three-dimensional matrix torus network 60). Those nodes 32 on the edges or faces of the torus network 60 may communicate through communications links (i.e., wires, leads, network connections) that are "wrapped" around the network 60.

Each node 32 includes a set of six node-to-node communications links. In the context of the present invention, and to illustrate communications in the torus network 60, the cell 45 includes a node 32a with the coordinates (7,0,0). This node 32a may be a particular type of node 32, such as a master compute node operable to control a subset of the compute nodes in the cell 45. As illustrated, the node 32a may communicate with any other node 32 in the torus network 60 by initially communicating to one of six "neighbor" nodes 32b-g linked to the node 32a through direct inter-nodal communications paths (i.e., paths which do not have to traverse another compute node 12). The coordinates of these neighbor nodes are (6,0,0) for node 32b, (0,0,0) for node 32c, (7,0,1) for node 32d, (7,0,7) for compute node 32e, (7,1,0) for compute node 32f, and (7,7,0) for compute node 32g. As shown in FIG. 4, the torus network 60 is "wrapped" at the edges. As such, for any given node 32, it is possible to algorithmically determine the set of neighbors of that node 32 from the matrix structure and location of that node 32 in the torus network 60.

It will be appreciated by one having skill in the art that the representative torus network 60 of FIG. 4 is merely illustrative, and that actual physical considerations may prevent the physical structure of the torus network 60 shown in FIG. 4.

Moreover, a wide variety of interconnection types, network types, member types, etc., may be permitted to coexist with one another in an efficient and reliable manner in parallel computing system. As such, nodes 32 in a cell 45 may be arranged in a tree network, bus network, linear network, mesh network, style-7 network, or another suitable network as is well known in the art without departing from the scope of the invention. Individual nodes may thus not be physically located in close proximity with other nodes as is well known in the art (i.e., the individual nodes may be geographically separated from other nodes).

Figure 5:
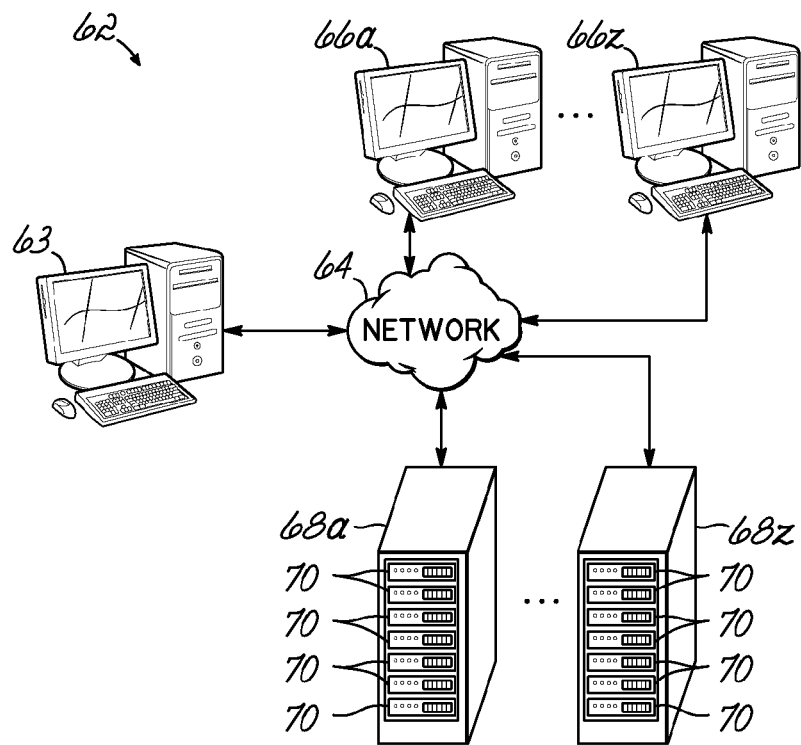
FIG. 5 is a diagrammatic illustration of an alternate embodiment of a parallel processing computing system that includes computing systems and servers consistent with embodiments of the invention.

FIG. 5 is a diagrammatic illustration of an alternate embodiment of a parallel processing computing system ("system") 62 consistent with embodiments of the invention. In the illustrated embodiment of FIG. 5, the nodes of the system 62 may include one or more computing systems 66a-z and/or servers 70. In this embodiment, there is a central administrators computer ("admin" computer) 63 connected to a network 64. The admin computer 63 manages the processing of the system and dispatches workloads and/or tasks to the computing systems 66a-z and/or servers 70. A plurality of servers 70 may be configured in a plurality of server cabinets, shown at 68a-z. Computing systems 66a-z and servers 70 in cabinets 68a-z, in specific embodiments, may be computers, computer systems, computing devices, servers, disk arrays, or programmable devices such as multi-user computers, single-user computers, handheld devices, networked devices (including computers in a cluster configuration), mobile phones, video game consoles (or other gaming systems), etc. As such, each of the computing systems 66a-z and servers 70 may each include one or more processors coupled to memory, operating systems, and network interfaces. Thus, the system 62 of FIG. 5 may operate in much the same way to perform parallel processing as the parallel computing system 10 shown throughout FIGS. 1-4. One having ordinary skill in the art will appreciate that the computing systems 66a-z and servers 70 may perform substantially the same function as the nodes 32 of the system 10. Each of the computing systems 66a-z and servers 70 may be further configured with an application, throttling module, and processing progress record substantially similar to those shown in FIG. 3. Therefore, the system 62 of FIG. 5 may be used to throttle the processing performance of one or more of the computing systems 66a-z and servers 70 consistent with embodiments of the invention.

While FIG. 1 illustrates separate resource servers 18 and service nodes 20, one having ordinary skill in the art will appreciate that the resource servers 18 may be service nodes 20 configured to maintain the resources of the system 10. Similarly, while FIG. 5 illustrates a separate admin computer 63 from the computing systems 66a-z and servers 70, one having ordinary skill in the art will appreciate that the admin computer 63 may be incorporated into one or more of the computing systems 66a-z and/or servers 70. Additionally, while the node 32 of FIG. 3 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like) operating as, or within, a parallel processing computing system.

Those skilled in the art will recognize that the environments illustrated in FIGS. 1-5 are not intended to limit the present invention. In particular, while the nodes of FIGS. 1-4 are shown connected in a modular fashion, any combination of local area networks (LAN's), wide area networks (WAN's) and/or other networking topologies known in the art may alternatively be used to network computing processors comprising nodes. Indeed, those skilled in the art will recognize that other alternative hardware and/or software environments may be used without departing from the scope of the invention For the sake of brevity, further discussion of embodiments consistent with the invention will be discussed in relation to the hardware and software implementation illustrated in FIGS. 1-4, and particularly in relation to nodes 32 of the system 10. One having ordinary skill in the art will appreciate that the following descriptions are thus equally applicable to the computing cores 34 of each of the nodes 32 of the system 10 of FIGS. 1-4, as well as the computing systems 66a-z and servers 70 and processors therein of the system 62 of FIG. 5. Thus, the discussion hereinafter will focus on the specific routines utilized in the above-described system 10 to throttle processing performance in one or more nodes 32. The routines executed to implement the embodiments of the invention, whether implemented as part of an operating system or a specific application, component, program, object, module or sequence of instructions executed by one or more nodes 32, computing cores 34, or other processors, will be referred to herein as "computer program code," or simply "program code." However, the routines executed by the nodes 32, computing cores 34, or other processors consistent with processing a portion of a workload (i.e., normal processing of an execution context, task, application 56, program, routine, process, object, etc), whether implemented as part of the operating system 54, application 56, component, program, object, module, or sequence of instructions executed by the node 32 will be referred to herein as "task." The computer program code typically comprises one or more instructions that are resident at various times in various memory and storage devices in the system 10, and that, when read and executed by one or more nodal or other processors of the system 10, cause that system to perform the steps necessary to execute steps, elements, and/or blocks embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Performance Throttling

Figure 6:
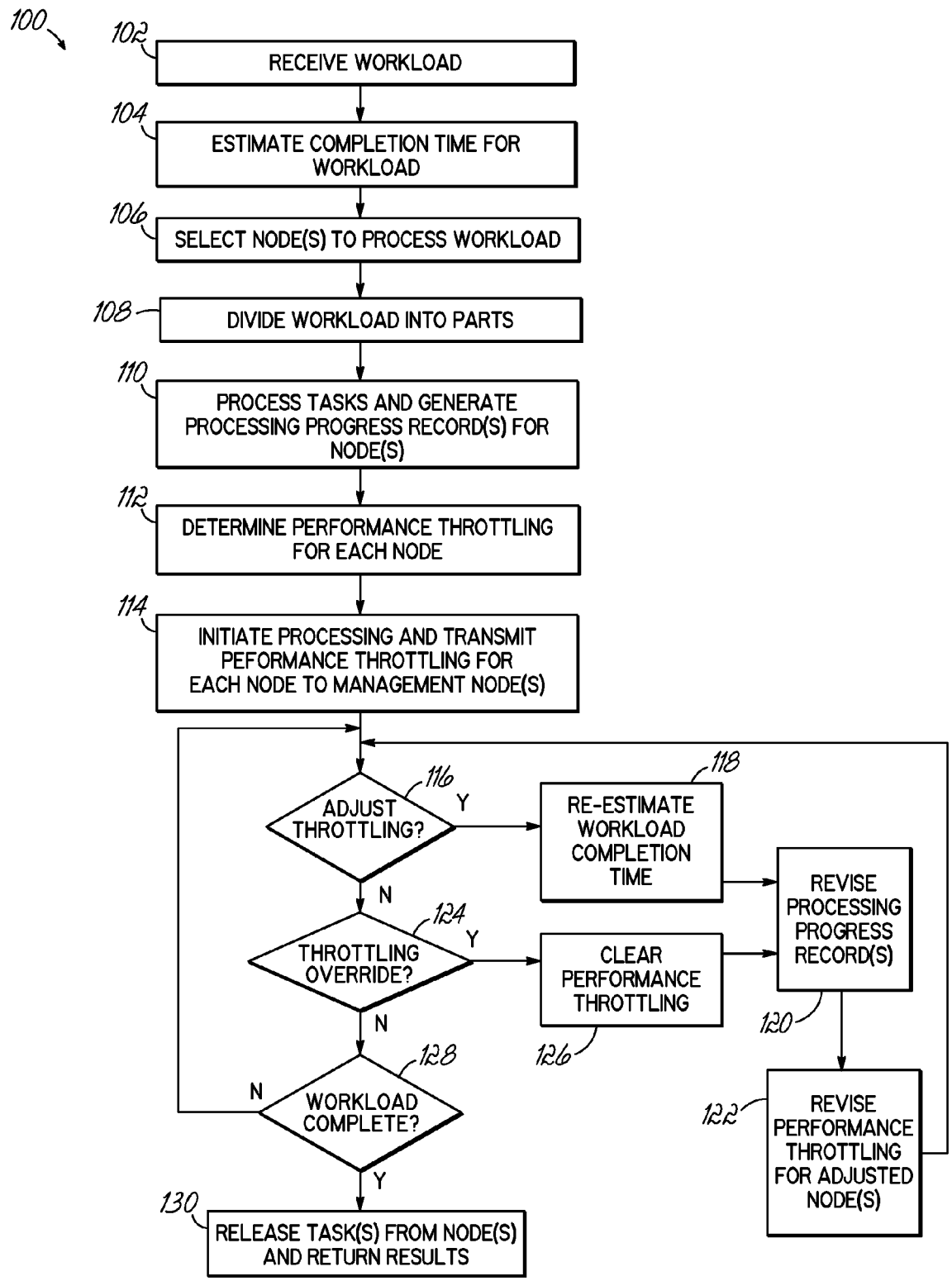
FIG. 6 is a flowchart illustrating blocks of a program code executable by the parallel processing computing system of FIG. 1 and FIG. 2 to address power consumption issues that arise when executing parts of a workload across the system by selectively throttling the performance of at least one computing node of the system.

FIG. 6 illustrates a flowchart for program code having blocks executable by the system 10 of FIGS. 1-4 to throttle the performance of at least one node 32 of the system 10, decreasing the power consumption of that node 32, and therefore the system 10, consistent with embodiments of the invention. In block 102, the system 10 receives a workload 24, 26, 28 (hereinafter, "workload"). The workload may be received at the front end nodes 16, across the network 22 from an external source, as part of a programmed routine, or in any other manner generally known in the art. In block 104, the program code estimates a workload completion time and stores it. As previously disclosed, the workload completion time may be determined with reference to historical data about previous workloads configured across a node 32 or nodes 32, historical data about the number of nodes 32 previously configured to process workloads, the number of tasks in the workload, the time required to access a resource or resources to complete a task or tasks of the workload, the amount of data in the workload, the number of free nodes 32, and/or the number of busy nodes 32, including the number of busy nodes 32 that are near completion of their current tasks. In block 106, the program code selects a node 32 or nodes 32 to process the workload. Advantageously, the program code attempts to select free nodes 32 to perform tasks of the workload.

In block 108, the program code may divide the workload into a plurality of parts, or tasks. For example, and in one specific embodiment, the workload may be divided into five tasks that may be executed at five nodes 32, or nodes 32 that (collectively) have five cores 34 operable to execute the five tasks. However, in some embodiments, the workload may not be divided (e.g., when the workload is one task that cannot be subdivided) and may be sent to one node 32. In block 110, each node 32 selected to process a task of the workload in block 106 processes, or otherwise receives, the task and the workload completion time. In one embodiment, in response to receiving a task, each of the selected nodes 32 generates a processing progress record 59 and stores the workload completion time in the processing progress record 59 in block 110. In an alternate embodiment, the program code generates a processing progress record 59 that includes the workload completion time in block 104, and that processing progress record 59 is subsequently received by the nodes 32 in block 110.

In block 112, the nodes 32 determine their performance throttling. In block 112, in response to receiving a task, the throttling module 58 of the node 32 analyzes the task or tasks that node 32 has received and estimates a node completion time that indicates a time for that node 32 to complete the task or tasks with no performance throttling. As such, the throttling module 58 on the node 32 may determine the node completion time with reference to historical data about previous tasks similar to the current task, historical data about the time required to access a resource or resources to complete the task, the amount of data in the task, and/or whether the node 32 is currently configured with another task. The throttling module 58 then compares the node completion time to the workload completion time. When the workload completion time in the processing progress record is later, or greater, than the node completion time, the throttling module 58 determines a performance throttling for the node 32 to conform the node completion time to the workload completion time such that the node 32 is run as slow as possible while still completing the task by the required and/or desired workload completion time. In this manner, conforming the completion time may include consuming a portion of time that would otherwise be wasted between completing the first part at full performance and then completing the second part at full performance. As such, the throttling module 58, in one embodiment, may lower the processing speed of the node 32 and/or the core 34 of the node 32, thus selectively throttling the performance of the node 32 and/or core 34. In an alternate embodiment, the throttling module 58 may configure the node 32 to access data from a resource of the system 10 that has a high latency (i.e., the data on that resource is associated with a large time delay to access, process, and/or retrieve that data), thus selectively throttling the performance of the node 32. The performance throttling operates to reduce the power consumption of the node 32. When the node completion time is later, or greater, than the workload completion time, the throttling module 58 does not selectively throttle performance of the node 32 and/or core 34. As such, the throttling module 58 may execute the task with no performance throttling. Additionally, the program code may attempt to reschedule the task, or execute the task on the node 32 and attempt to conform the node completion time as closely as possible to the workload completion time.

In block 112, the throttling module 58 may update the processing progress record 59 of the node 32 with the performance throttling for that node 32 and the node completion time. As such, the throttling module 58 may store the workload completion time, node completion time, performance throttling, and/or lack of performance throttling for a node 32 in the processing progress record 59.

In block 114, the program code initiates the execution of the workload by each node 32 configured with a task of the workload. Additionally in block 114, the processing progress record 59 for each node 32 or the data related to the node completion time, performance throttling, and/or lack of performance throttling for each node configured with a task of the workload is transmitted to the nodes 32 that received the workload (hereinafter, "management nodes"), which may be the front end nodes 16 or service nodes 20. In this way, the throttling of the nodes 32 may be monitored and/or managed at one location.

In block 116, the program code analyzes the throttling and/or node completion time for each node 32 that received a task of the workload to determine whether to adjust the workload completion time of any of those nodes 32. The program code may adjust the workload completion time of one or more nodes 32, or even all the nodes 32, in response to determining that the node completion time of one or more nodes 32 is greater than the workload completion time, that the one or more nodes 32 will complete their task too soon, or that one or more nodes 32 cannot complete a task of the workload with the current level of performance throttling by the workload completion time. The latter condition may occur after processing of a task has begun and be in response to a changed condition of a node 32 indicating that that node 32 cannot complete the task of the workload with the current level of performance throttling by the completion time. Alternately, the latter condition may occur in response to another changed condition of the system 10 (for example, such as one or more node 32 experiencing a failure, a resource attempting to be accessed by that node experiencing a failure, or a network of the system 10 experiencing a failure). In some embodiments, the program code may be configured to allow one or more nodes 32 to "miss" the workload completion time when the node completion time is later than the workload completion time. In those embodiments, the task on the nodes 32 that have a later node completion time than the workload completion time may be a less important, the task may be a execution intensive task that cannot be completed by the workload completion time, other system 10 processes may be performed while waiting for "late" nodes 32, or the program code may determine that the later node completion time is not critical.

When the program code determines that the performance throttling of one or more nodes 32 should be adjusted, the program code re-estimates the workload completion time for the one or more nodes 32 in block 118. In block 120, the one or more nodes 32 receive the revised workload completion time and revise their processing progress records to include the revised workload completion. As such, the one or more nodes 32 may re-estimate their node completion times and revise their performance throttling in block 122. In an alternate embodiment, the management nodes re-estimate the performance throttling of each node 32 and communicate the re-estimated workload completion time and revised performance throttling to each node 32 in block 120. After block 122, the program code may proceed back to block 116.

When the program code determines not to adjust performance throttling, the program code determines whether to override the performance throttling for one or more nodes 32 in block 124. The program code may override the performance throttling of a busy node 32 in response to determining that there is work, such as another task, waiting to be executed by that busy node 32 in block 124, or the program code may override the performance throttling of the one or more nodes in response to determining that those one or more nodes 32 will not complete their task by the workload completion time. When the program code determines that overriding the performance throttling is appropriate, the program code clears the performance throttling for those nodes 32 (i.e., allows the nodes to use one-hundred percent of their processing capabilities) in block 126. In block 120, the processing progress records 59 may be revised and the nodes 32 that are overridden may revise their performance throttling (e.g., the nodes 32 that are overridden may determine that they have no performance throttling) in block 122.

When the program code makes a determination not to override the throttling performance of the one or more nodes 32, the program code determines whether the workload has completed in block 128. When the workload is complete, the program code frees each task on nodes 32 that are finished processing tasks and do not have tasks waiting for execution, then returns the results of the workload to the management nodes in block 130. As such, the program code may throttle each free node 32 to reduce the power consumed by those nodes 32. When the workload has not completed, the program code returns to block 116 to continue processing the workload.

Further details and embodiments of the present invention will be described by way of the following examples.

EXAMPLE 1

No Performance Throttling

Figure 7:
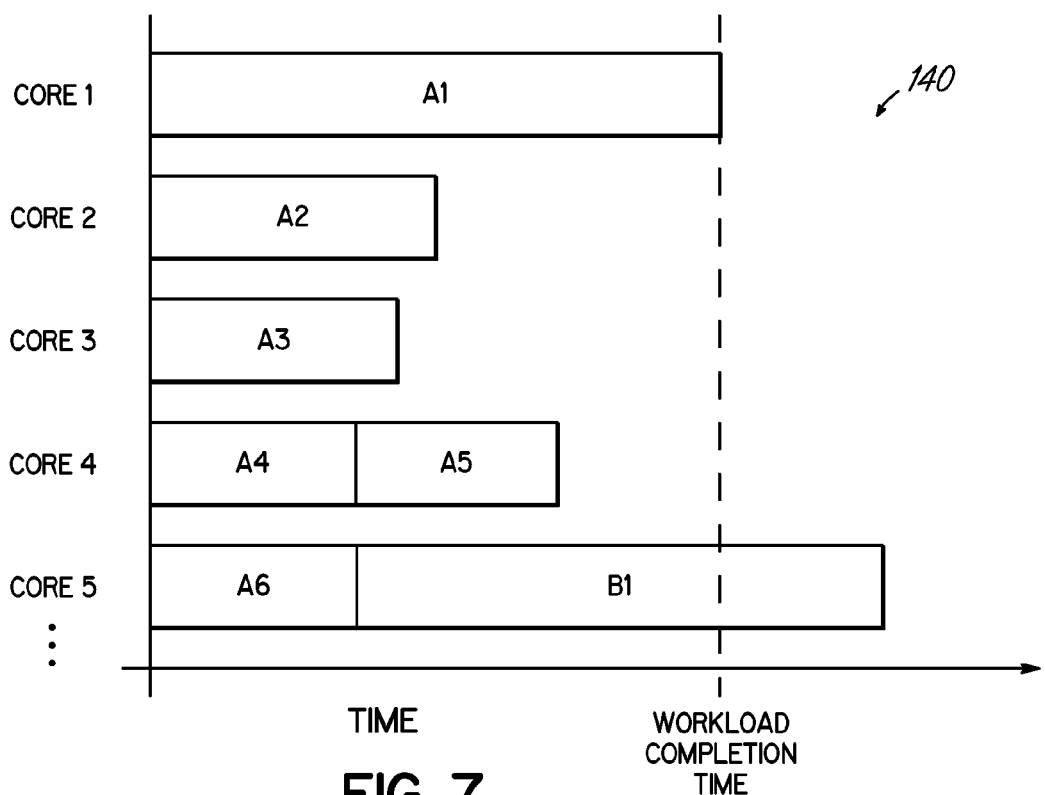
FIG. 7 is a diagrammatic illustration of conventional task scheduling on computing cores of a conventional parallel processing computing system that illustrates the race of the cores to process tasks at full performance and without performance throttling.

By way of example, the system 10 may include at least five cores 34 and receive a first and second workload. The first workload (workload "A") may be divided into six tasks (illustrated as tasks A1-A6), while the second workload (workload "B") may not be divided (e.g., workload B is a single task, illustrated as task B1). FIG. 7 is a diagrammatic illustration 140 of how tasks A1-A6 and task B1 may be scheduled and executed across the five cores (labeled cores 1-5) consistent with conventional parallel processing systems. As illustrated in FIG. 7, as well as FIG. 8 and FIG. 9, the x-axis of each illustration diagrammatically illustrates time. As such, workload A is divided into six tasks (e.g., A1-A6) and scheduled across the five cores 34, each core 34 operating to execute each task as quickly as possible. Workload B, which is received after workload A, is scheduled shortly after workload A. As shown in FIG. 7, workload A is time-limited by task A1, resulting in a significant wasted time after tasks A2, A3, and A5. Cores 2, 3, and 4 produce excess heat and consume excess power during execution of tasks A2, A3, and the combination of tasks A4 and A5, respectively.

EXAMPLE 2

Performance Throttling

Figure 8:
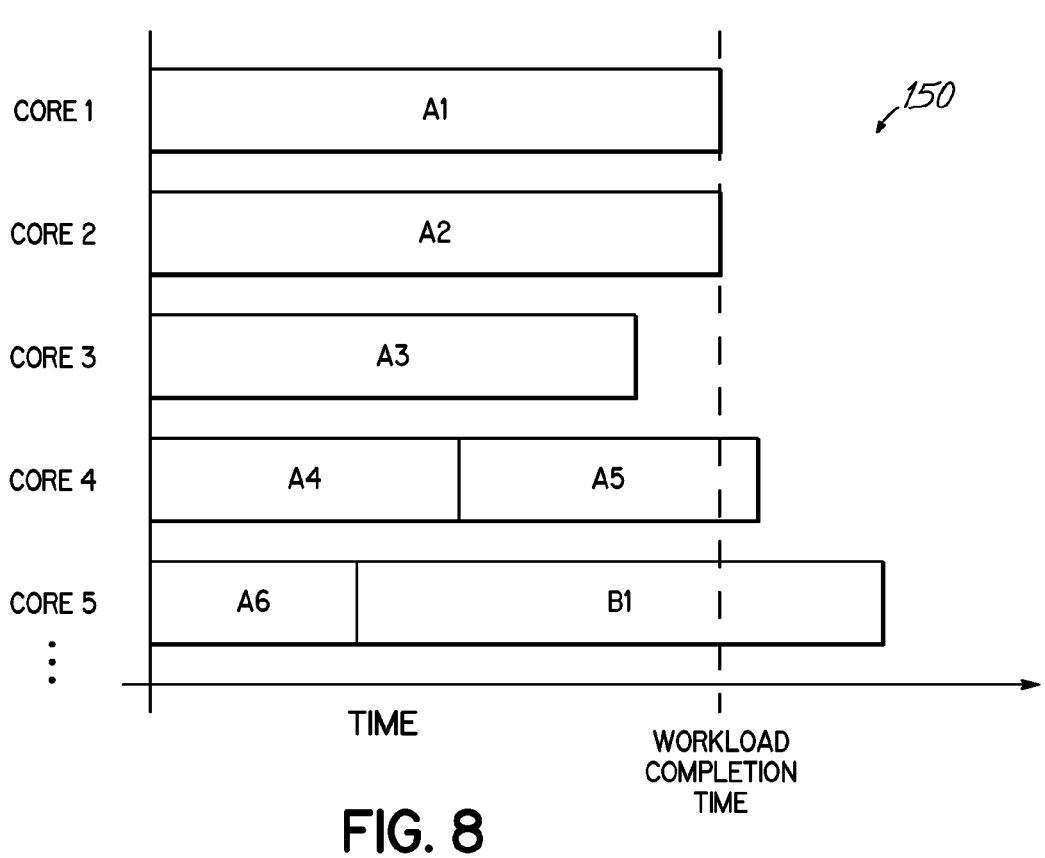
FIG. 8 is a diagrammatic illustration of task scheduling and performance throttling on computing cores of the parallel processing computing system of FIG. 1 and FIG. 2 that illustrates selectively throttling the performance of a plurality of computing cores of the system to conform the completion times of the tasks of those cores consistent with embodiments of the invention.

FIG. 8 is a diagrammatic illustration 150 of how tasks A1-A6 and task B1 might be scheduled, and the performance of cores 1-5 throttled, consistent with embodiments of the invention. As shown in FIG. 8, the original workload completion time is indicated by a dashed line and may represent when the last of the tasks of the workload A are expected to be completed. This dashed line is also shown in FIG. 7, for illustrative purposes. Returning to FIG. 8, task A1 is still the time limiting task. However, other cores 34 are throttled to conform the completion times of those cores 34 to the completion time of the core 34 executing task A1 (i.e., core 1). As such, task A2 completes at substantially the same time as task A1, while task A3 may complete at a time somewhat before the workload completion time for workload A. The combination of tasks A4 and A5 may complete at a time somewhat later than the workload completion time for workload A, which, though later, still conforms better with the workload completion time. As such, the completion times for task A3 and the combination of tasks A4 and A5 are shown to conform with those of tasks A1 and A2. It will be appreciated that conforming completion time of task A3 and the combination of tasks A3 and A4 includes consuming a portion of time that would otherwise be wasted between completing tasks A3 and the combination of tasks A4 and A5 at full performance. As shown in FIG. 8, task A6 is completed at full performance in light of task B1. Thus, performance throttling may be overridden in response to a busy core (i.e., core 5) being further configured to process a task (i.e., task B1) once freed. In this manner, the illustration 150 of FIG. 8 illustrates performance throttling cores of a parallel processing computing system consistent with embodiments of the invention to reduce the power consumption of that parallel processing computing system.

EXAMPLE 3

Levels of Performance Throttling

Figure 9:
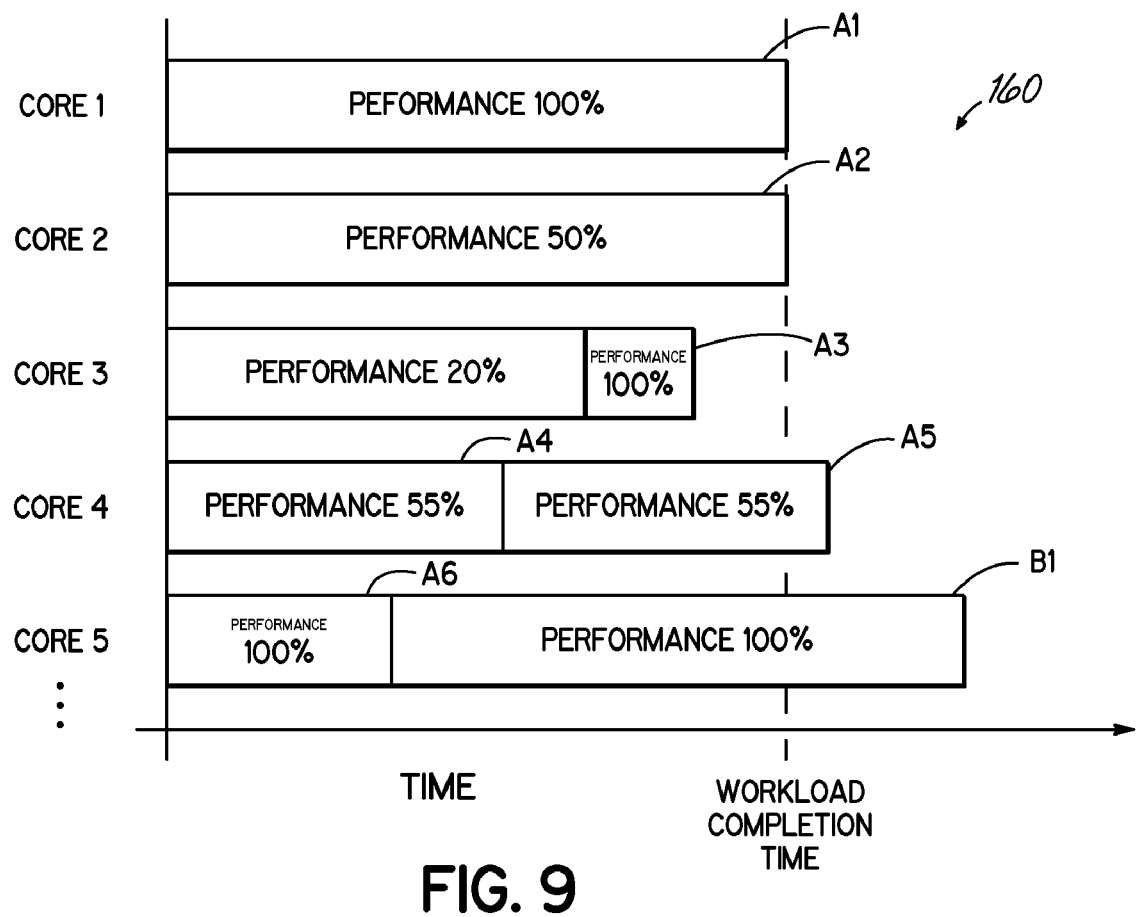
FIG. 9 is a diagrammatic illustration of the task scheduling and performance throttling on computing cores of the parallel processing computing system of FIG. 1 and FIG. 2, and similar to that illustrated in FIG. 8, which further illustrates adjusting the performance throttling of at least one computing core while processing tasks of a workload.

FIG. 9 is a diagrammatic illustration 160 that shows the level of performance throttling for the cores 34 executed tasks A1-A6 of workload A and task B1 of workload B illustrated in FIG. 8. Again, the original workload completion time is indicated by a dashed line and may represent when the last of the tasks of the workload A are expected to be completed in FIG. 9. As illustrated in FIG. 9, core 1 operates at 100% of its full performance to execute task A1 and complete that task by the workload completion time for workload A. However, core 2 is throttled to operate at 50% of its full performance to execute task A2 and complete that task by the workload completion time. Core 3 undergoes two separate performance throttling adjustments consistent with embodiments of the invention. Program code may determine that core 3 can operate at 20% of its full performance to complete Task A3 by the workload completion time. At some point in time, the program code may determine that core 3 will not complete task A3 by the workload completion time, and may override the throttling of core 3 to operate core 3 at 100% of its full performance. Core 4 operates at 55% of its full performance to execute both tasks A4 and A5. Core 5 operates at 100% of its full performance to execute both tasks A6 and B1. As such, core 5 may have received both tasks A6 and B1, then may have had any performance throttling overridden. In this manner, the illustration 160 of FIG. 9 illustrates aspects of performance throttling cores of a parallel processing computing system consistent with embodiments of the invention to reduce the power consumption of that parallel processing computing system While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method described. One having ordinary skill in the art will further appreciate that the disclosure of the present invention is suitable to implement performance throttling in nodes 32, as well as in the computing cores 34 of nodes 32. Thus, the invention in its broader aspects should not be limited to the specific flowchart illustrated FIG. 6. As such, the blocks of FIG. 6 may be re-ordered without departing from the scope of the invention. In addition, while the completion time of parts of a workload are conformed in the illustrated embodiments based upon calculations involving absolute or relative completion times, it will also be appreciated that duration calculations may alternatively be used to conform completion times of parts of a workload. Accordingly, departures may be made from such details without departing from the scope of applicants' general inventive concept.

What is claimed is:

1. A method of optimizing power consumption of a parallel computing system of the type that includes a plurality of computing nodes configured to process a workload, the method comprising:

respectively executing a plurality of parts of the workload on the plurality of computing nodes in the parallel computing system, including concurrently executing a first part of the workload on a first computing node among the plurality of computing nodes and a second part of the workload on a second computing node among the plurality of computing nodes; and selectively throttling performance of the first computing node during execution of the first part of the workload to decrease power consumption of the first computing node and to conform a completion time for the first computing node in completing the first part of the workload with a completion time for the second computing node in completing the second part of the workload, wherein selectively throttling performance of the first computing node further comprises:

generating a first node completion time, wherein the first node completion time indicates a first estimated completion time for the first computing node in completing the first part of the workload at full performance;

generating a second node completion time, wherein the second node completion time indicates a second estimated completion time for the second computing node in completing the second part of the workload at full performance;

comparing the first and second node completion times; and based upon the comparison of the first and second node completion times, selectively throttling the first computing node to decrease execution speed of the first part of the workload to consume a portion of time that would otherwise exist between the first and second node completion times.

2. The method of claim 1, wherein each completion time is calculated based on historical data about a completion time of at least one previous workload.

3. The method of claim 1, wherein each completion time is calculated based on historical data about a plurality of completion times of a plurality of parts of at least one previous workload.

4. The method of claim 1, wherein each completion time is calculated based on the amount of data in the workload.

5. The method of claim 1, wherein each completion time is calculated based on the amount of data in at least one part of the plurality of parts of the workload.

6. The method of claim 1, wherein each completion time is calculated based on a time required to access at least one resource of the parallel computing system to process the workload.

7. The method of claim 1, wherein each completion time is calculated based on a time required to access at least one resource of the parallel computing system to process at least one part from among the plurality of parts of the workload.

8. The method of claim 1, wherein selectively throttling performance of the first computing node during execution of the first part of the workload further includes:

lowering a processing speed for the first computing node.

9. The method of claim 1, wherein selectively throttling performance of the first computing node during execution of the first part of the workload further includes:

configuring the first computing node to access data on a resource of the parallel computing system that has a high latency.

10. The method of claim 1, further comprising:

selectively throttling performance of the first computing node when it has completed the first part of the workload to decrease power consumption of the first computing node; and selectively throttling performance of the second computing node when it has completed the second part of the workload to decrease power consumption of the second computing node.

11. A method of optimizing power consumption of a parallel computing system of the type that includes a plurality of computing nodes configured to process a workload, the method comprising:

respectively executing a plurality of parts of the workload on the plurality of computing nodes in the parallel computing system, including concurrently executing a first part of the workload on a first computing node among the plurality of computing nodes and a second part of the workload on a second computing node among the plurality of computing nodes;

selectively throttling performance of the first computing node during execution of the first part of the workload to decrease power consumption of the first computing node and to conform a completion time for the first computing node in completing the first part of the workload with a completion time for the second computing node in completing the second part of the workload; and overriding the throttled performance of the first computing node during execution of the first part of the workload to increase power consumption of the first computing node when there is work to be processed on the first computing node after completion of the first part of the workload.

12. The method of claim 11, wherein the work is a third part of the workload.

13. The method of claim 11, wherein the workload is a first workload, and wherein the work is a part of a second workload.

14. A method of optimizing power consumption of a parallel computing system of the type that includes a plurality of computing nodes configured to process a workload, the method comprising:

respectively executing a plurality of parts of the workload on the plurality of computing nodes in the parallel computing system, including concurrently executing a first part of the workload on a first computing node among the plurality of computing nodes and a second part of the workload on a second computing node among the plurality of computing nodes;

selectively throttling performance of the first computing node during execution of the first part of the workload to decrease power consumption of the first computing node and to conform a completion time for the first computing node in completing the first part of the workload with a completion time for the second computing node in completing the second part of the workload; and overriding the throttled performance of the first computing node during execution of the first part of the workload to increase power consumption of the first computing node in response to determining that the first part of the workload will not be completed by the completion time for the second computing node in completing the second part of the workload.

15. A parallel computing system, comprising:

a plurality of computing nodes, each computing node including a processing unit; and program code configured to be executed by the parallel computing system to optimize power consumption of the parallel computing system, the program code further configured to initiate execution of a plurality of parts of the workload on the plurality of computing nodes in the parallel computing system, including concurrently execute a first part of the workload on a first computing node among the plurality of computing nodes and a second part of the workload on a second computing node among the plurality of computing nodes, and selectively throttle performance of the first computing node during execution of the first part of the workload to decrease power consumption of the first computing node and to conform a completion time for the first computing node in completing the first part of the workload with a completion time for the second computing node in completing the second part of the workload;

wherein the program code is further configured to generate a first node completion time, wherein the first node completion time indicates a first estimated completion time for the first computing node in completing the first part of the workload at full performance, generate a second node completion time, wherein the second node completion time indicates a second estimated completion time for the second computing node in completing the second part of the workload at full performance, compare the first and second node completion times, and based upon the comparison of the first and second node completion times, selectively throttle the first computing node to decrease execution speed of the first part of the workload to consume a portion of time that would otherwise exist between the first and second node completion times.

16. The system of claim 15, wherein the program code is further configured to lower a processing speed for the first computing node.

17. The system of claim 15, wherein the program code is further configured to configure the first computing node to access data on a resource of the parallel computing system that has a high latency.

18. The system of claim 15, the program code further configured to selectively throttle performance of the first computing node when it has completed the first part of the workload to decrease power consumption of the first computing node and selectively throttle performance of the second computing node when it has completed the second part of the workload to decrease power consumption of the second computing node.

19. The system of claim 15, the program code further configured to override the throttled performance of the first computing node during execution of the first part of the workload to increase power consumption of the first computing node when there is work to be processed on the first computing node after completion of the first part of the workload.

20. The system of claim 15, the program code further configured to override the throttled performance of the first computing node during execution of the first part of the workload to increase power consumption of the first computing node in response to determining that the first part of the workload will not be completed by the completion time for the second computing node in completing the second part of the workload.

21. A program product, comprising:

program code configured upon execution to optimize power consumption of a parallel computing system of the type including a plurality of computing nodes, the program code further configured to initiate execution of a plurality of parts of a workload on the plurality of computing nodes in the parallel computing system, including concurrently execute a first part of the workload on a first computing node among the plurality of computing nodes and a second part of the workload on a second computing node among the plurality of computing nodes, and selectively throttle performance of the first computing node during execution of the first part of the workload to decrease power consumption of the first computing node and to conform a completion time for the first computing node in completing the first part of the workload with a completion time for the second computing node in completing the second part of the workload; and a recordable computer readable medium bearing the program code;

wherein the program code is further configured to generate a first node completion time, wherein the first node completion time indicates a first estimated completion time for the first computing node in completing the first part of the workload at full performance, generate a second node completion time, wherein the second node completion time indicates a second estimated completion time for the second computing node in completing the second part of the workload at full performance, compare the first and second node completion times, and based upon the comparison of the first and second node completion times, selectively throttle the first computing node to decrease execution speed of the first part of the workload to consume a portion of time that would otherwise exist between the first and second node completion times.

* * * * *